US012741486B1

(12) United States Patent
Geraets et al.

(10) Patent No.: US 12,741,486 B1
(45) Date of Patent: Sep. 22, 2026

(54) TRAILER APPARATUS WITH CONFIGURABLE WHEEL ASSEMBLY AND UNDERRIDE GUARD POSITIONING

(71) Applicants: Pat Geraets, Mitchell, SD (US); Brent Hohman, Fulton, SD (US); Dale Dierks, Mitchell, SD (US)

(72) Inventors: Pat Geraets, Mitchell, SD (US); Brent Hohman, Fulton, SD (US); Dale Dierks, Mitchell, SD (US)

(73) Assignee: Trail-Eze, Inc., Mitchell, SD (US)

( * ) Notice: Subject to any disclaimer, the term of this patent is extended or adjusted under 35 U.S.C. 154(b) by 397 days.

(21) Appl. No.: 18/525,327

(22) Filed: Nov. 30, 2023

(51) Int. Cl.
*B60B 35/00* (2006.01)
*B60R 19/56* (2006.01)
*B62D 53/08* (2006.01)
*B62D 63/08* (2006.01)

(52) U.S. Cl.
CPC .......... *B60B 35/005* (2013.01); *B60B 35/006* (2013.01); *B60R 19/56* (2013.01); *B62D 53/0842* (2013.01); *B62D 63/08* (2013.01)

(58) Field of Classification Search
CPC ..... B60B 35/005; B60B 35/006; B60R 19/56; B62D 53/0842; B62D 63/08
USPC .......................................................... 280/149.2
See application file for complete search history.

(56) References Cited

U.S. PATENT DOCUMENTS 3,102,738 A * 9/1963 De Roshia ............ B60P 1/6481 303/2
5,088,763 A 2/1992 Galazin
5,314,201 A * 5/1994 Wessels ............... B62D 53/068 180/209
5,720,489 A 2/1998 Pierce
7,086,674 B2 * 8/2006 Goertz .................... B60R 19/56 293/133

(Continued)

FOREIGN PATENT DOCUMENTS

CN 109018006 12/2018

OTHER PUBLICATIONS

Federal Motor Vehicle Safety Standards; Rear Impact Guards, Rear Impact Protection, Federal Register, vol. 87, No. 135, 35 pages, Jul. 15, 2022.

*Primary Examiner* — Karen Beck
*Assistant Examiner* — Caitlin Anne Miller
(74) *Attorney, Agent, or Firm* — Jeffrey A. Proehl; Woods, Fuller, Shultz & Smith PC

(57) ABSTRACT

A trailer apparatus may have a primary frame structure with a forward end and a rearward end and a longitudinal direction, and a supplemental frame structure movable in the longitudinal direction with respect to the primary frame structure. The supplemental frame structure may include a wheel assembly for supporting the trailer apparatus on a ground surface beneath the apparatus and an underride guard construct for blocking movement of a vehicle under the rearward end of the primary frame structure. A longitudinal position of the underride guard construct with respect to the primary frame structure may be adjustable independent of a longitudinal position of the wheel assembly with respect to the primary frame structure. A method may include adjusting a position of the first subframe with the underride guard construct and a position of the second subframe with the wheel assembly independently of each other in the longitudinal direction.

18 Claims, 17 Drawing Sheets

(56) References Cited

U.S. PATENT DOCUMENTS

| | | | | |
|---|---|---|---|---|
| 7,198,298 | B2 | 4/2007 | Ramsey | |
| 7,527,309 | B2 * | 5/2009 | Smidler | B60R 19/56 293/155 |
| 7,658,412 | B2 | 2/2010 | Ramsey | |
| 7,909,560 | B1 * | 3/2011 | Nespor | B60P 3/122 414/538 |
| 8,641,074 | B2 | 2/2014 | Goedken | |
| 9,352,714 | B2 * | 5/2016 | Batzer | B60R 19/56 |
| 9,422,015 | B1 * | 8/2016 | Fraley | B62D 21/09 |
| 9,487,171 | B2 * | 11/2016 | Rogers | B60R 19/565 |
| 2020/0385072 | A1 * | 12/2020 | Schutt | B60G 9/003 |
| 2022/0258819 | A1 * | 8/2022 | Cowley | B62D 63/061 |
| 2023/0113053 | A1 * | 4/2023 | Forthoffer | G01S 13/931 342/70 |

* cited by examiner

TRAILER APPARATUS WITH CONFIGURABLE WHEEL ASSEMBLY AND UNDERRIDE GUARD POSITIONING

BACKGROUND

Field

The present disclosure relates to vehicles, and more particularly vehicle trailers, and pertains to a new trailer apparatus which is configurable to permit positioning of a wheel assembly and an underride guard of the trailer apparatus to facilitate compliance with regulations placed upon the positions of these elements on trailers.

SUMMARY

Some aspects of the present disclosure relate to a trailer apparatus having a longitudinal axis, and the apparatus may comprise a primary frame structure having a forward end and a rearward end and a longitudinal direction oriented parallel to the longitudinal axis of the trailer apparatus. The trailer apparatus may also comprise a supplemental frame structure movable in the longitudinal direction with respect to the primary frame structure. The supplemental frame structure may include a wheel assembly for supporting the trailer apparatus on a ground surface beneath the apparatus and an underride guard construct for blocking movement of a vehicle under the rearward end of the primary frame structure. A longitudinal position of the underride guard construct with respect to the primary frame structure may be adjustable independent of a longitudinal position of the wheel assembly with respect to the primary frame structure.

Some aspects of the present disclosure relate to a method of adjusting longitudinal positions of components of a trailer. The method may include providing a trailer apparatus having a primary frame structure having a forward end and a rearward end and a longitudinal direction extending between the forward and rearward ends, and having a supplemental frame structure positioned below the primary frame structure and being movable in the longitudinal direction with respect to the primary frame structure. The supplemental frame structure may include a first subframe having an underride guard construct for blocking movement of a vehicle under the rearward end of the primary frame structure, and a second subframe having a wheel assembly for supporting the trailer apparatus on a ground surface beneath the apparatus. The method may further include adjusting a position of the first subframe with the underride guard construct in the longitudinal direction with respect to a position of the second subframe with the wheel assembly by moving the first and second subframes in the longitudinal direction independently of each other.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
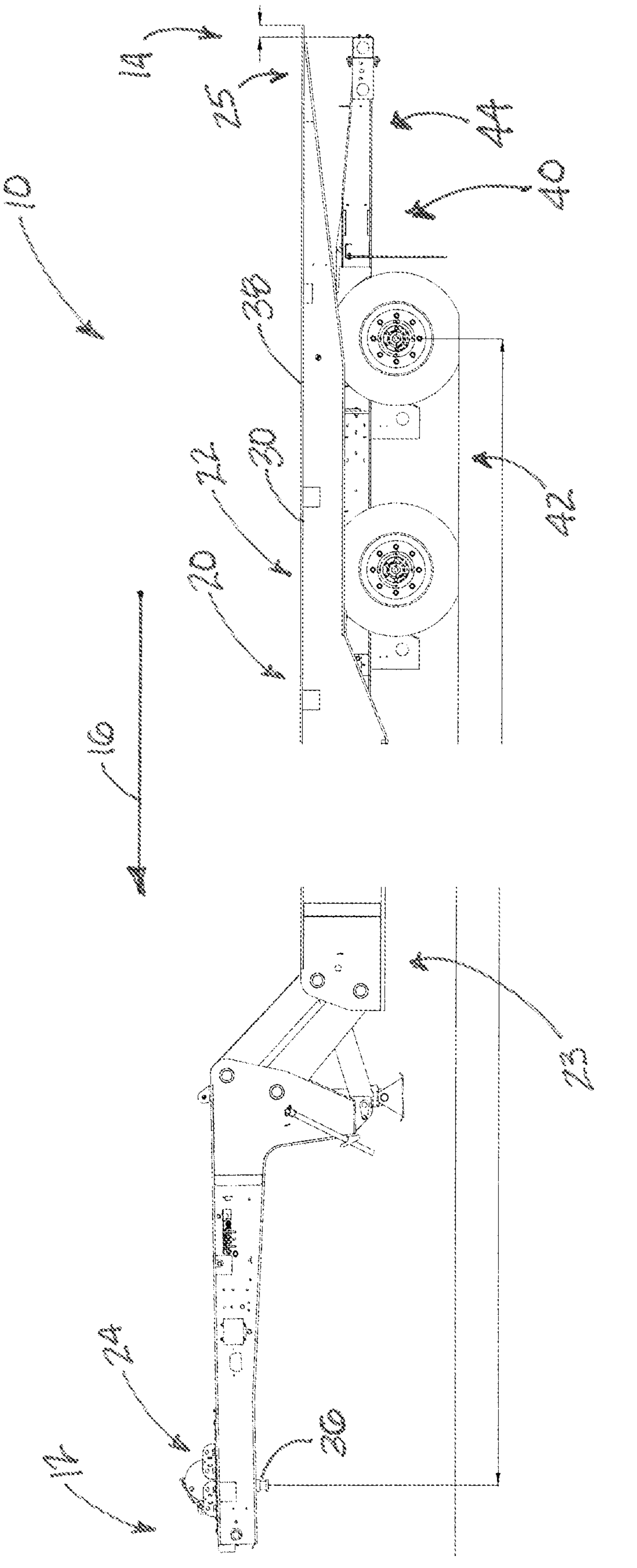
FIG. 1 is a schematic side view of front and rear end portions of a new configurable trailer apparatus according to the present disclosure.
Figure 2:
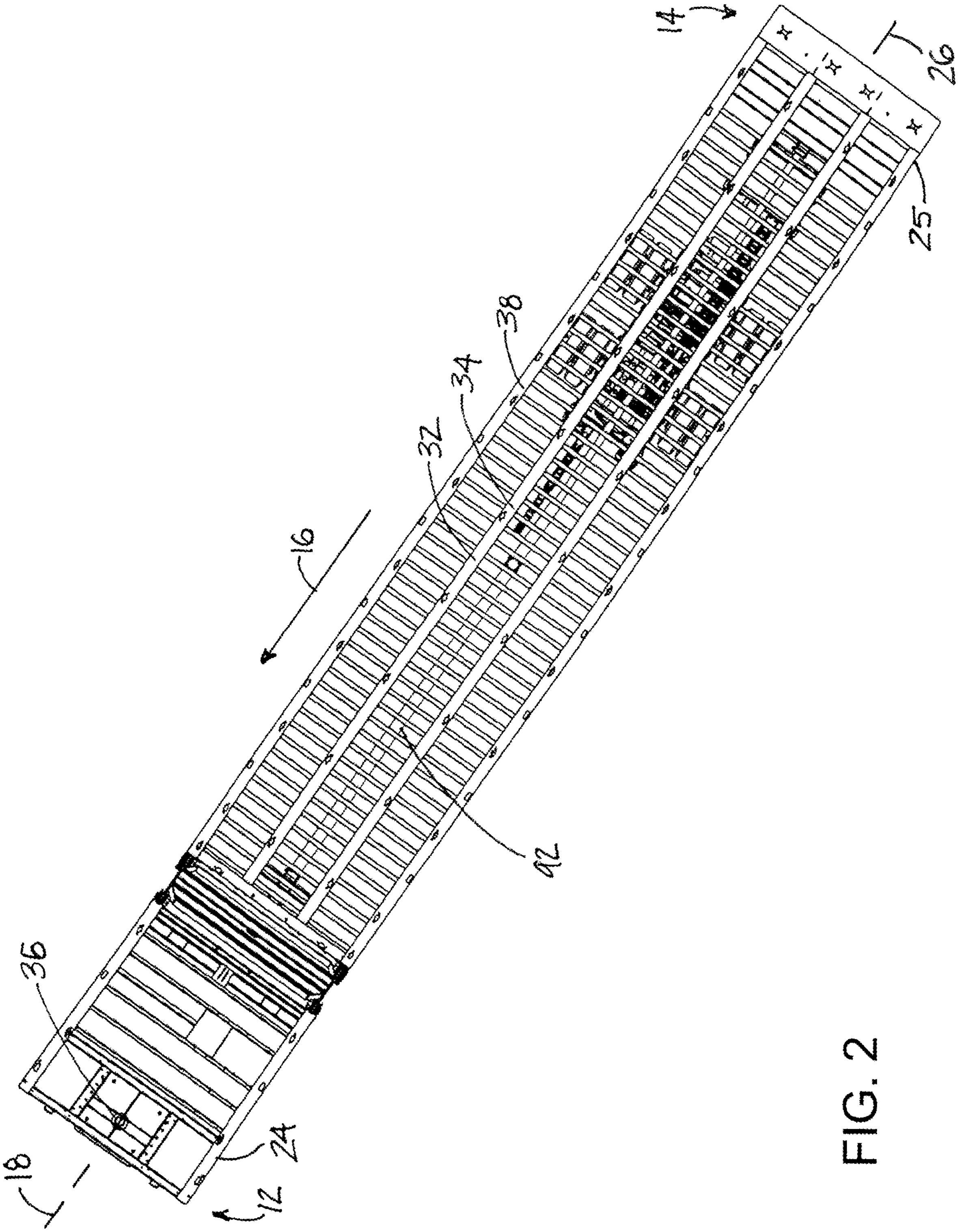
FIG. 2 is a schematic top view of the trailer apparatus, according to an illustrative embodiment.
Figure 3:
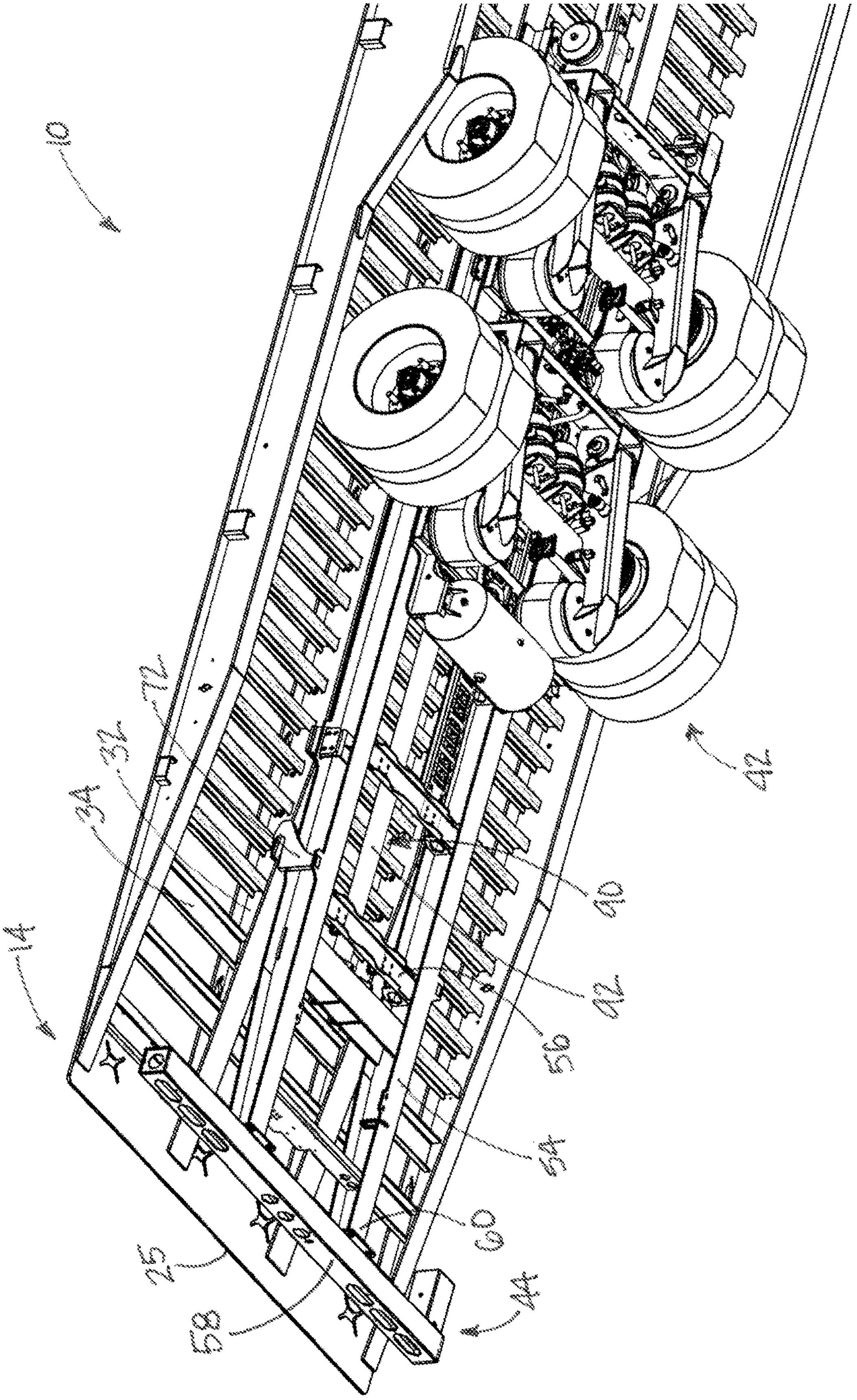
FIG. 3 is a schematic perspective view of a rear portion of the underside of the trailer apparatus, according to an illustrative embodiment.
Figure 4:
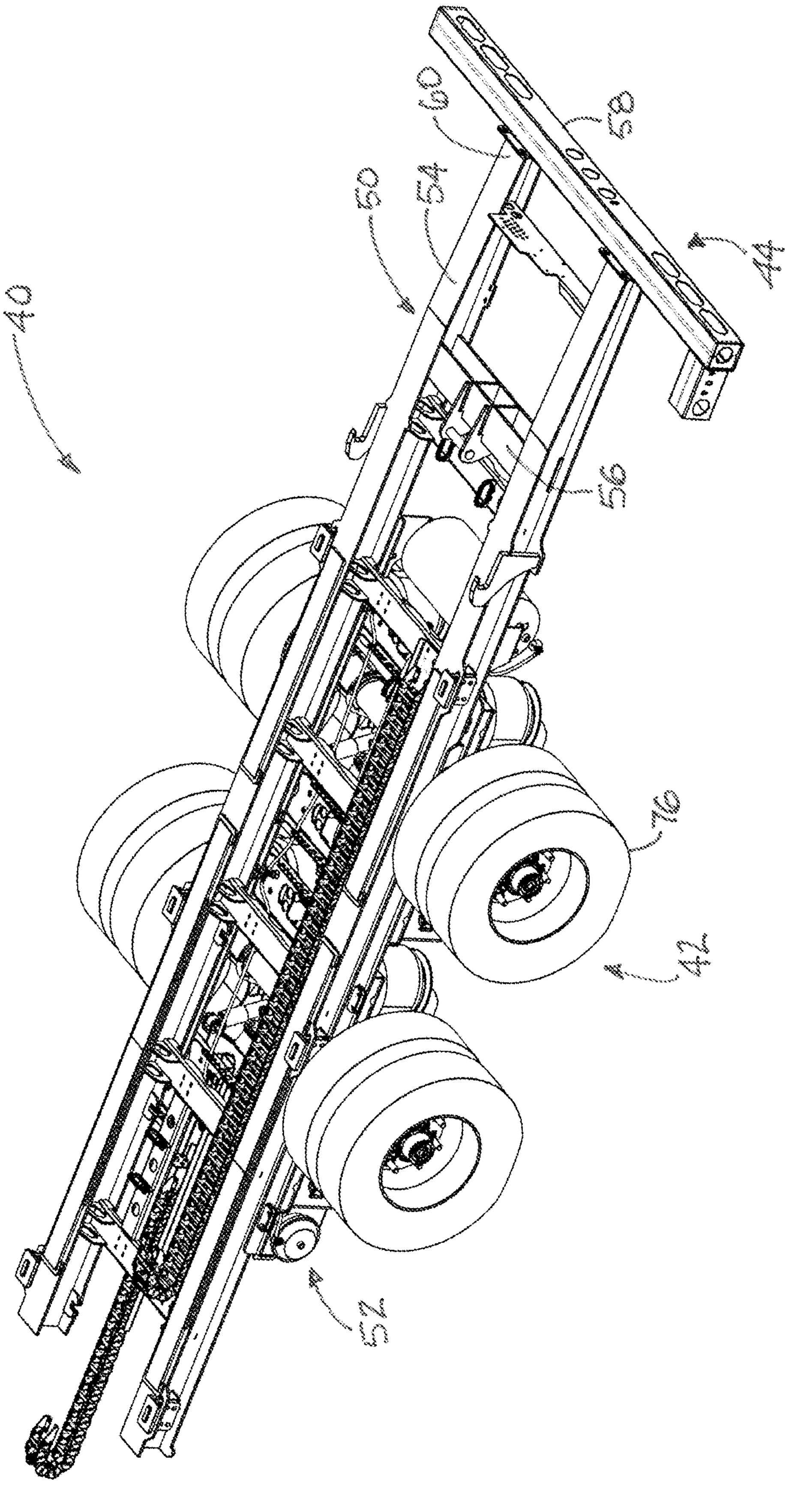
FIG. 4 is a schematic perspective view of the supplemental frame structure isolated from other elements of the trailer apparatus, according to an illustrative embodiment.
Figure 5:
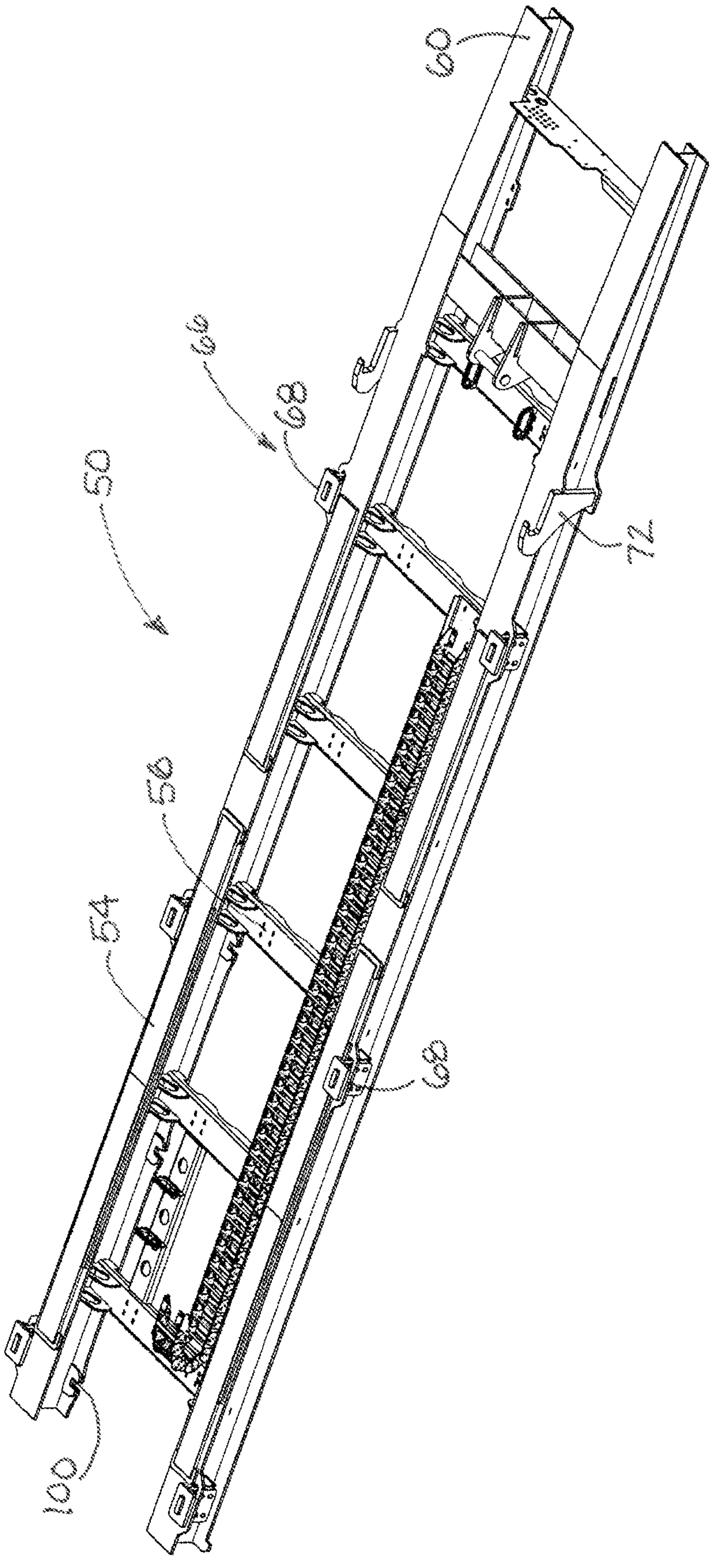
FIG. 5 is a schematic perspective view of the first subframe of the supplemental frame structure shown isolated from other elements of the trailer apparatus, according to an illustrative embodiment.
Figure 6:
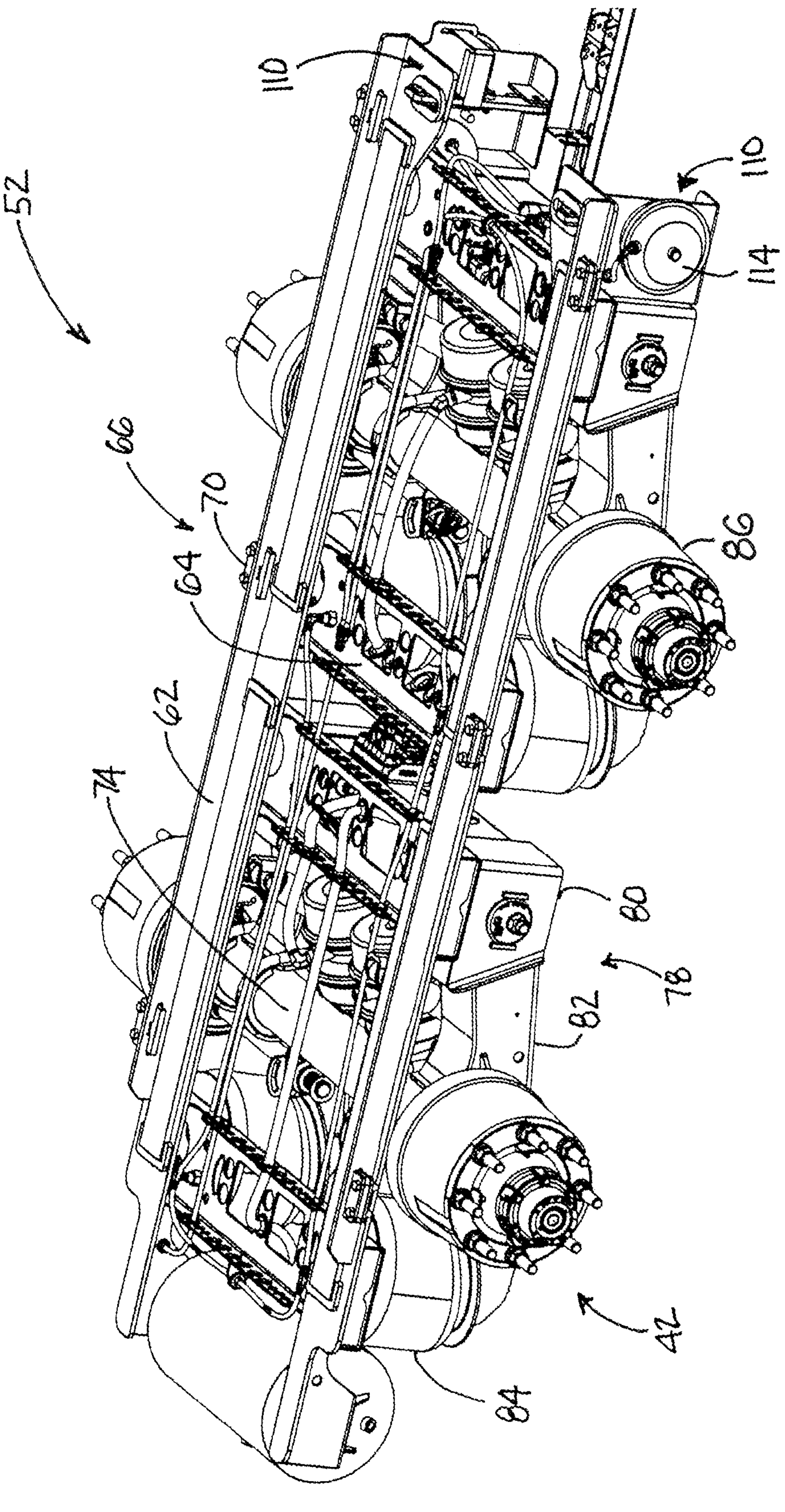
FIG. 6 is a schematic perspective view of the second subframe of the supplemental frame structure and wheel assemblies shown isolated from other elements of the trailer apparatus, according to an illustrative embodiment.
Figure 7:
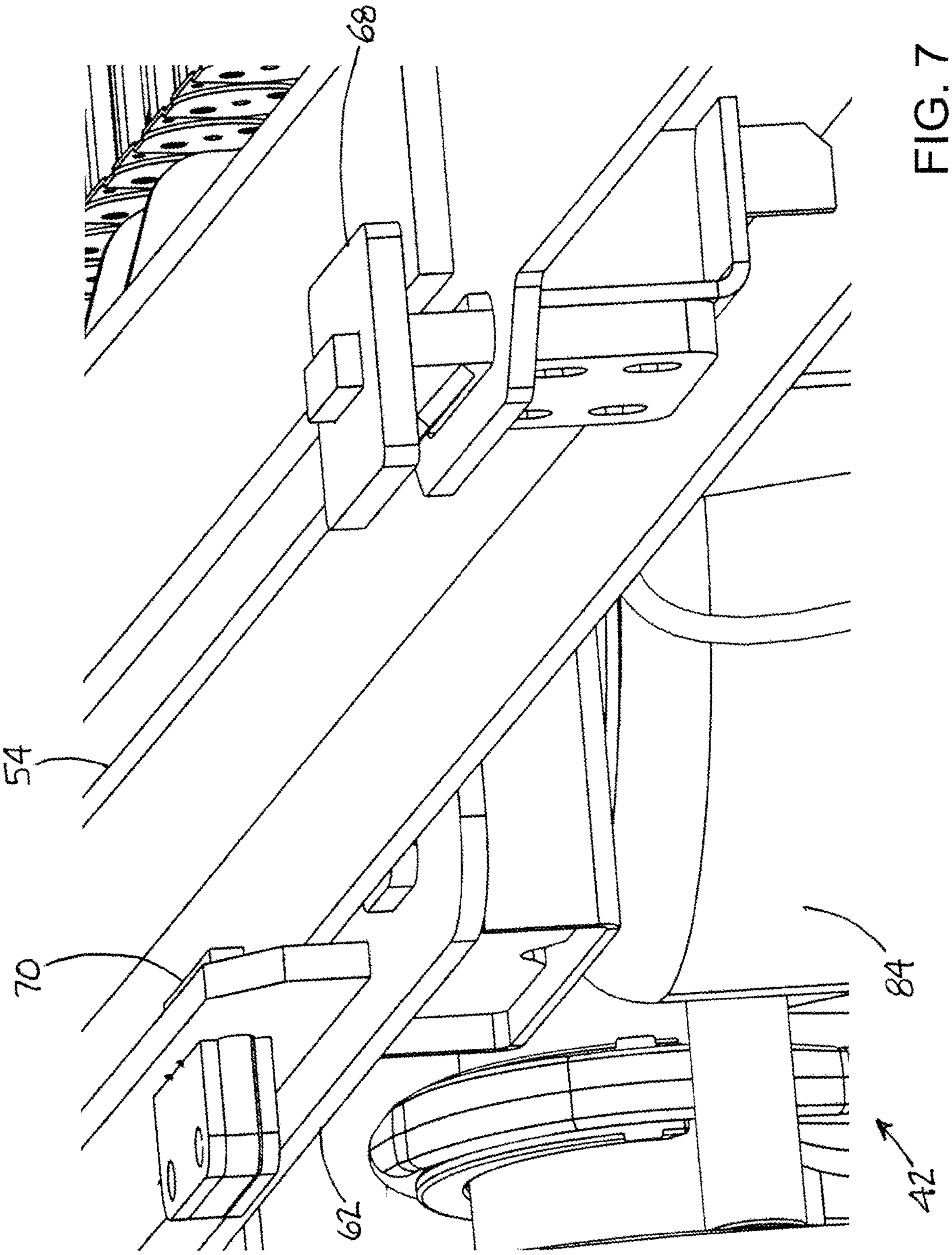
FIG. 7 is a schematic perspective view of a portion of the trailer apparatus showing parts of the subframe mounting components, according to an illustrative embodiment.
Figure 8:
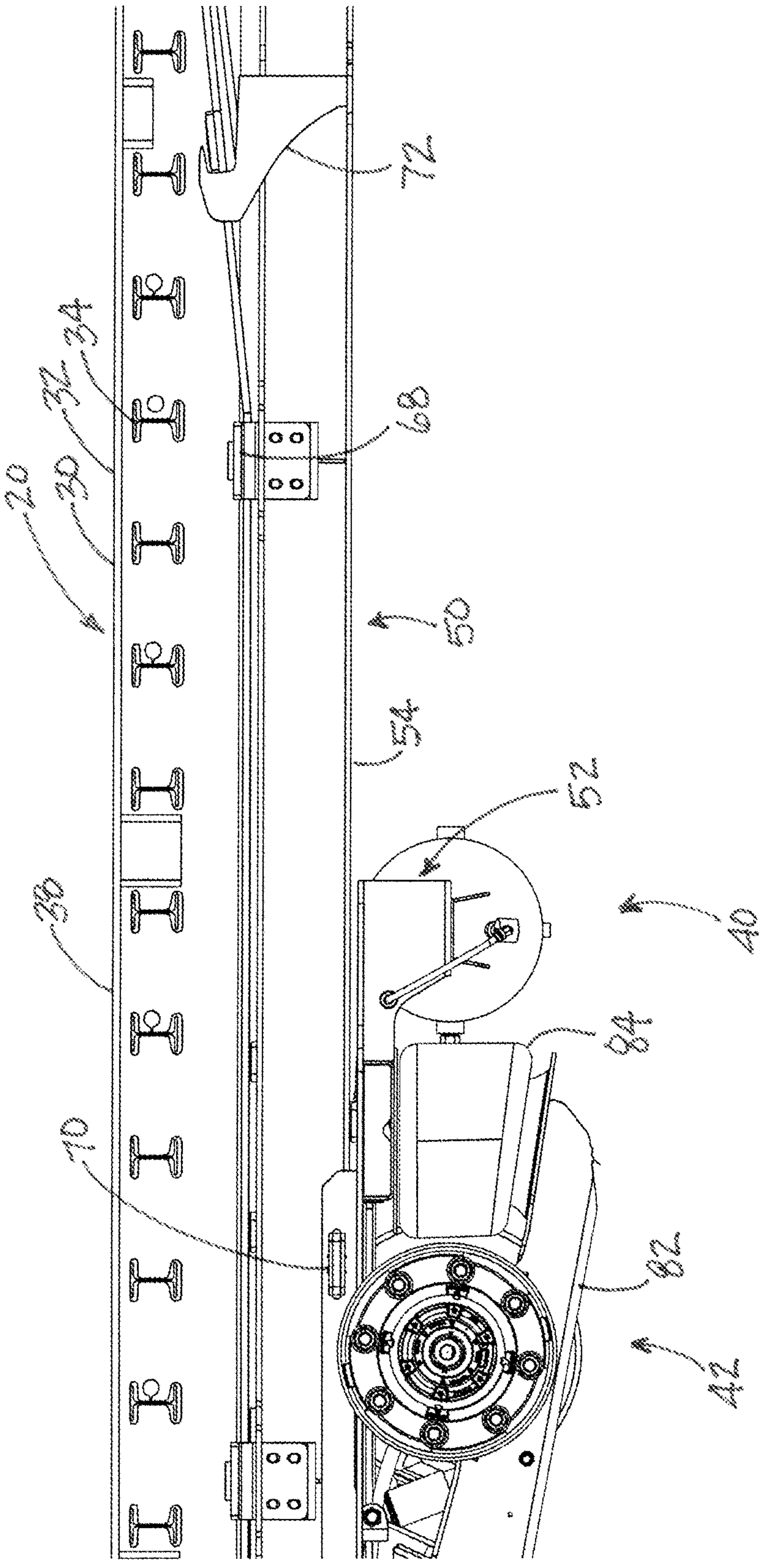
FIG. 8 is a schematic side view of a portion of the trailer apparatus showing parts of the subframe mounting components, according to an illustrative embodiment.
Figure 9:
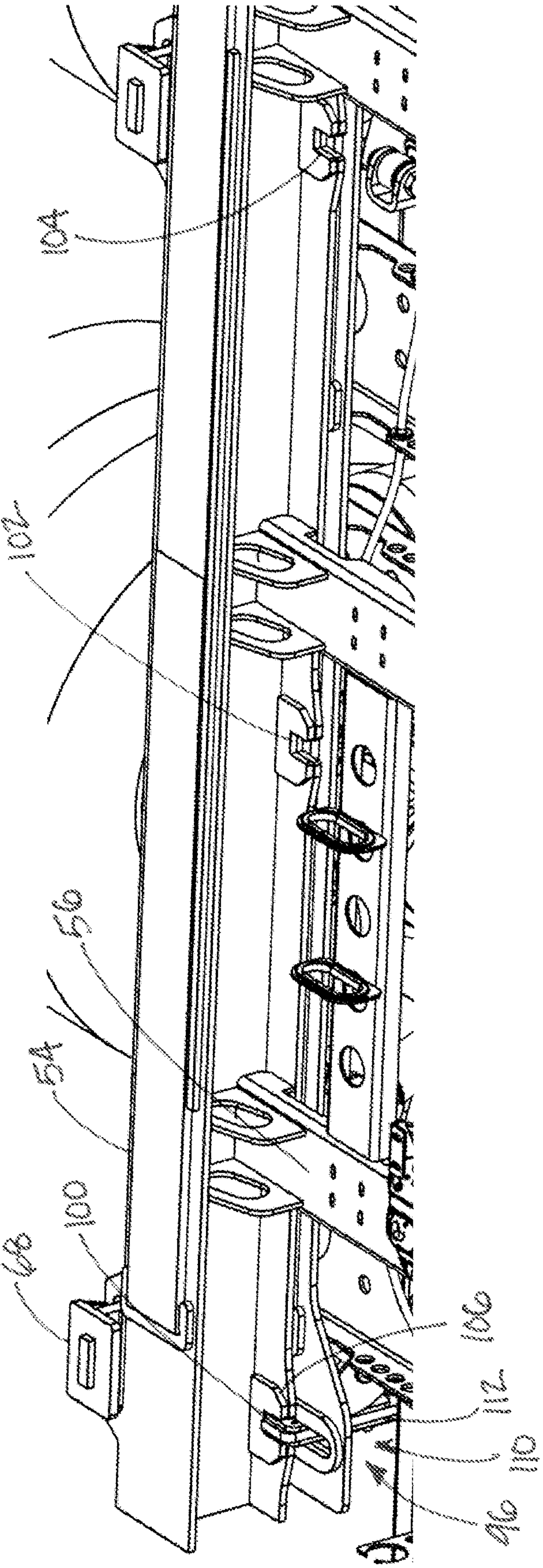
FIG. 9 is a schematic perspective view of a portion of the trailer apparatus showing parts of the position locking assembly, according to an illustrative embodiment.
Figure 10:
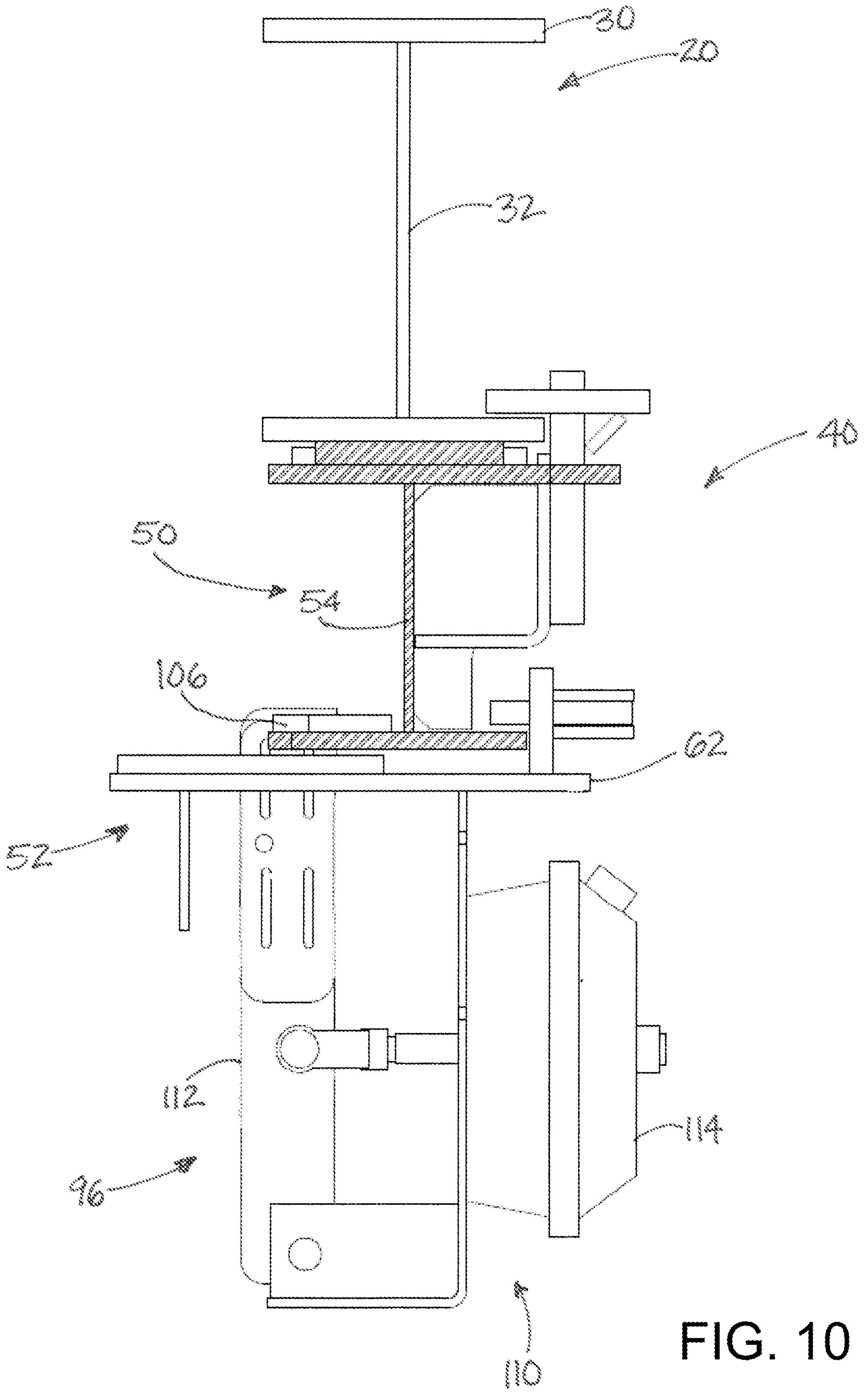
FIG. 10 is a schematic lateral sectional view of a portion of the trailer apparatus showing parts of the position locking assembly, according to an illustrative embodiment.
Figure 11:
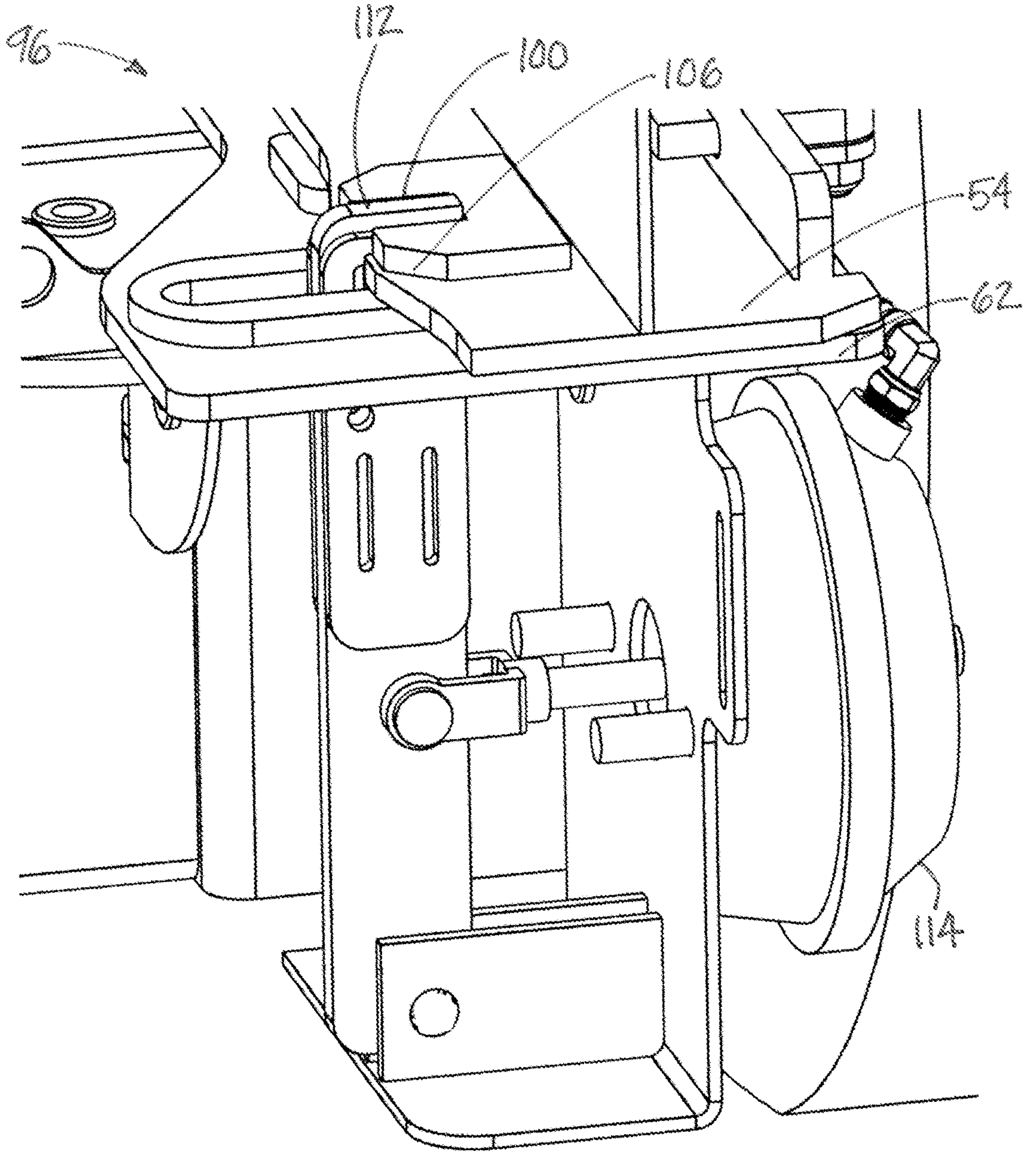
FIG. 11 is a schematic perspective view of a portion of the trailer apparatus showing parts of the position locking assembly, according to an illustrative embodiment.
Figure 12:
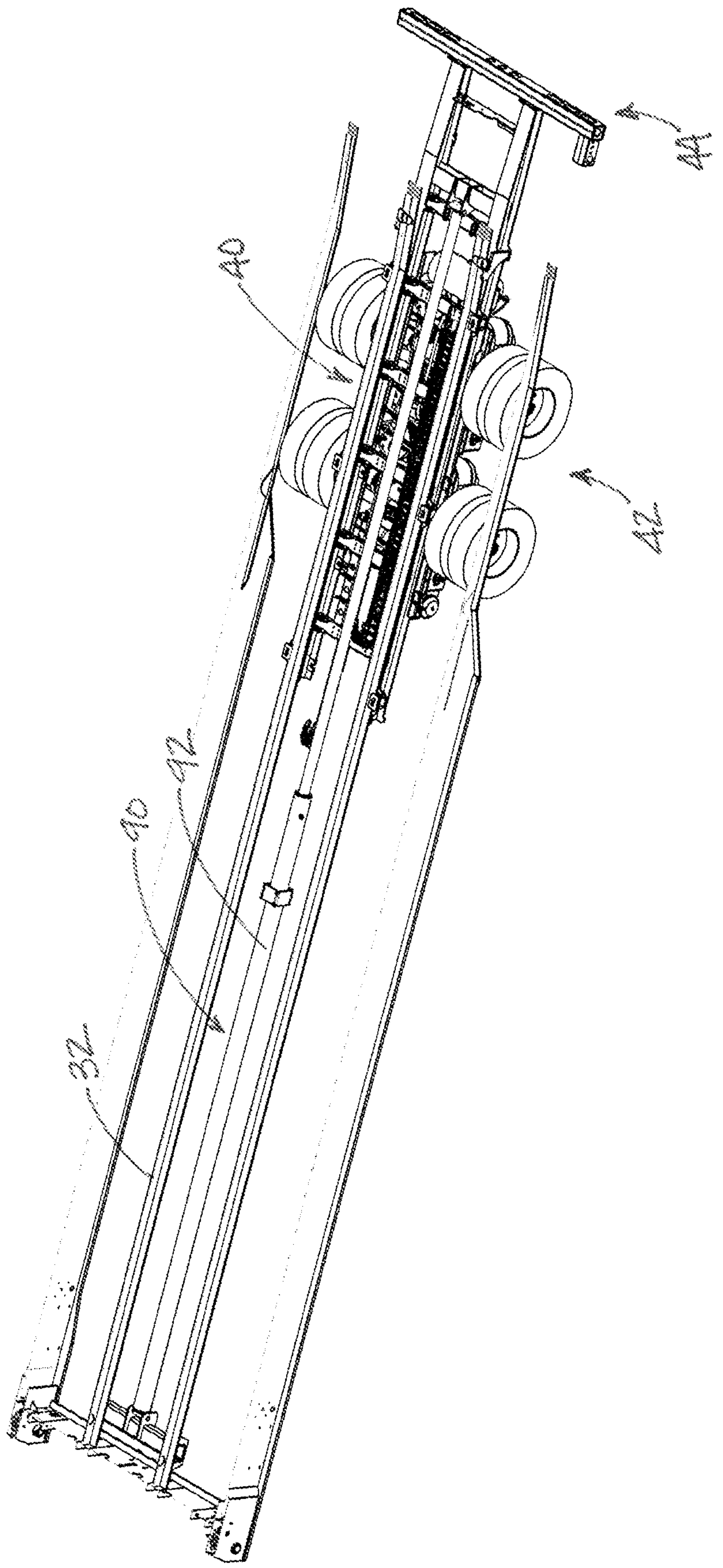
FIG. 12 is a schematic perspective view of the trailer apparatus with portions of the primary frame structure removed to reveal detail of the underlying parts, according to an illustrative embodiment.
Figure 13A:
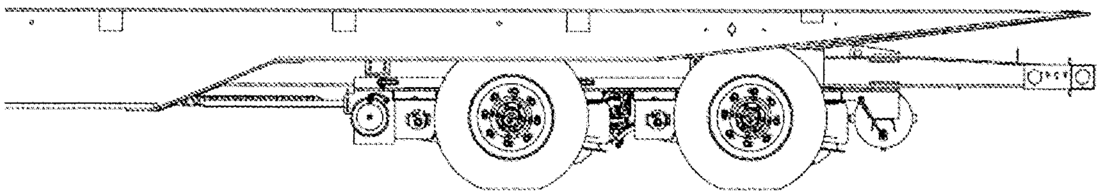
FIG. 13A is a schematic side view of a rear portion of the trailer apparatus with the second subframe of the supplemental frame structure and the wheel assembly shown of the supplemental in a rearward location with respect to the primary frame structure, according to an illustrative embodiment.
Figure 13B:
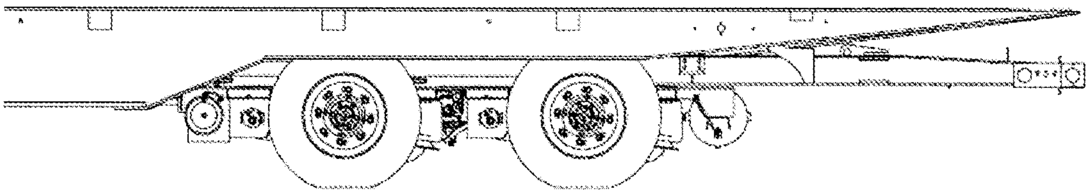
FIG. 13B is a schematic side view of a rear portion of the trailer apparatus with the second subframe of the supplemental frame structure and the wheel assembly shown of the supplemental in a medial location with respect to the primary frame structure, according to an illustrative embodiment.
Figure 13C:
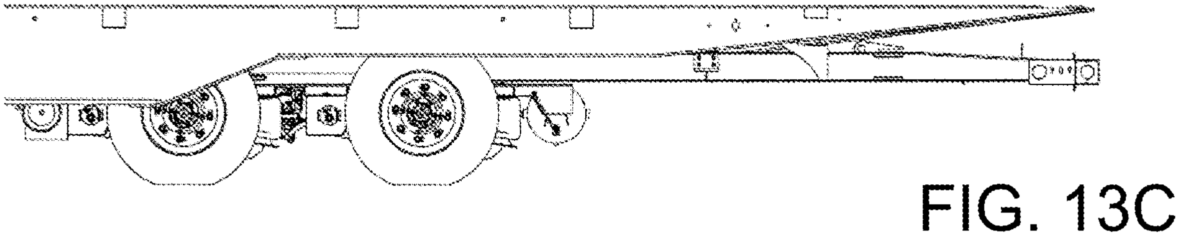
FIG. 13C is a schematic side view of a rear portion of the trailer apparatus with the second subframe of the supplemental frame structure and the wheel assembly shown of the supplemental in a forward location with respect to the primary frame structure, according to an illustrative embodiment.
Figure 14:
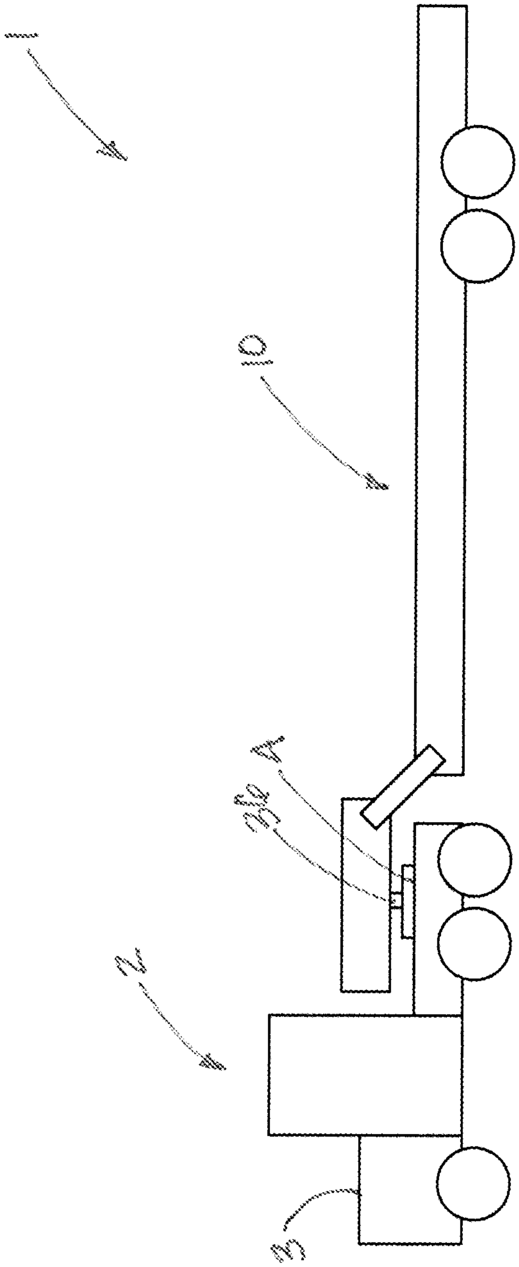
FIG. 14 is a schematic side view of a system including a tractor and the trailer apparatus, according to an illustrative embodiment.
Figure 15:
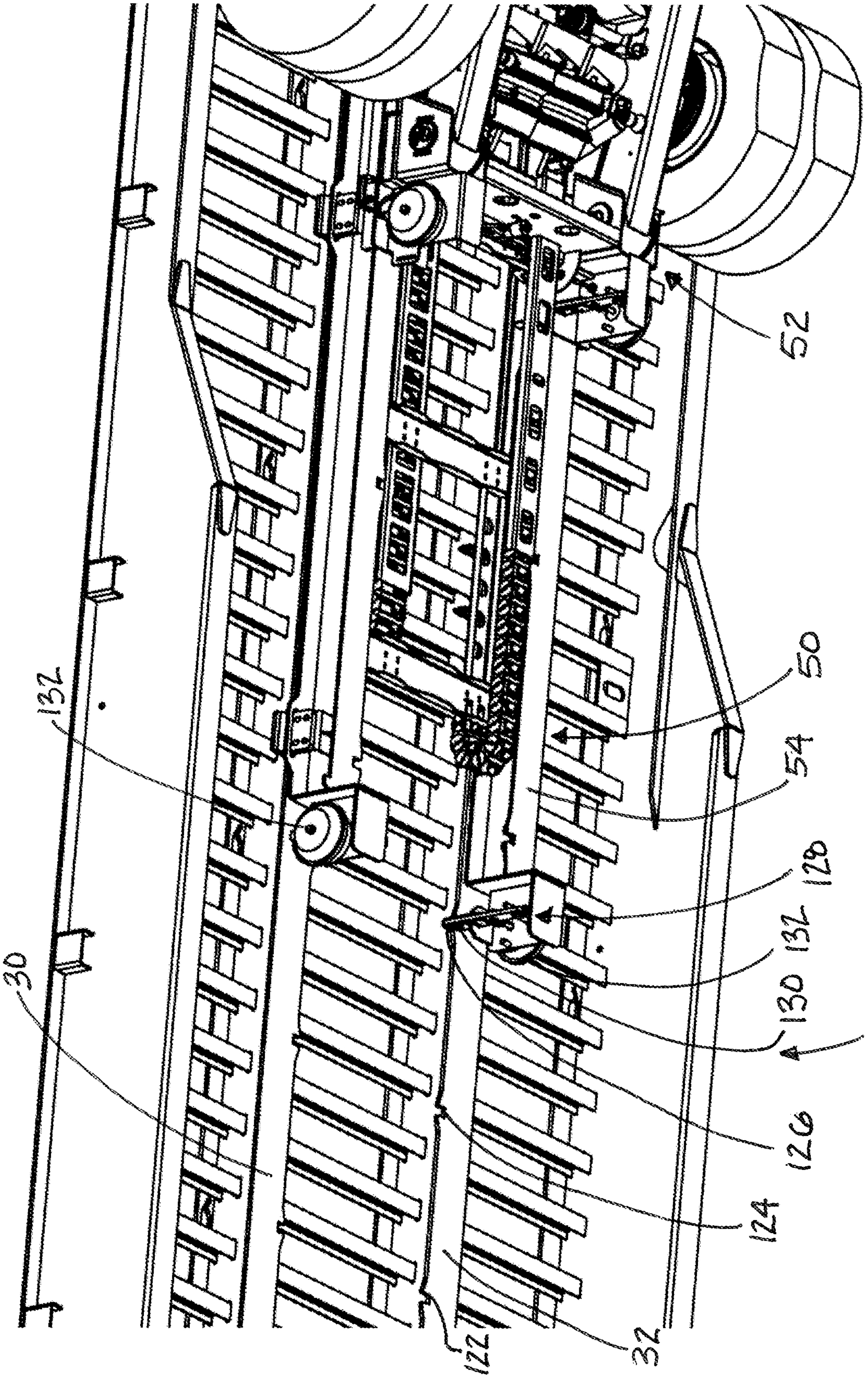
FIG. 15 is a schematic perspective view of the underside of a portion of a trailer utilizing an optional position locking assembly to selectively lock positions of the main frame of the primary frame structure and the first subframe of the supplemental frame structure with respect to each other, according to an illustrative embodiment.
Figure 16A:
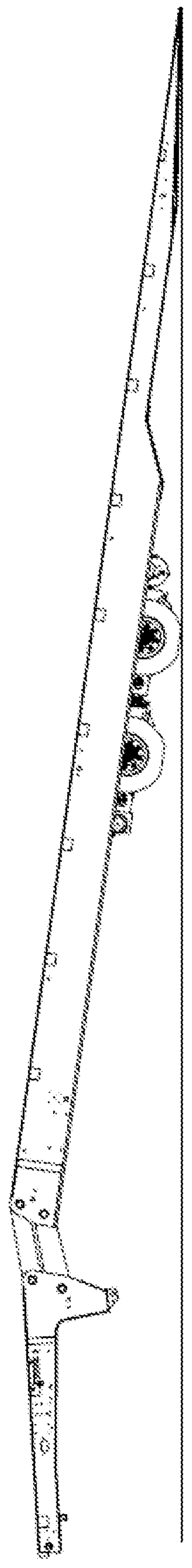
FIG. 16A is a schematic side view of the trailer apparatus in a configuration suitable for loading of the apparatus and having elements of the supplemental frame structure in a relatively rearward position with respect to the main frame structure, according to an illustrative embodiment.
Figure 16B:
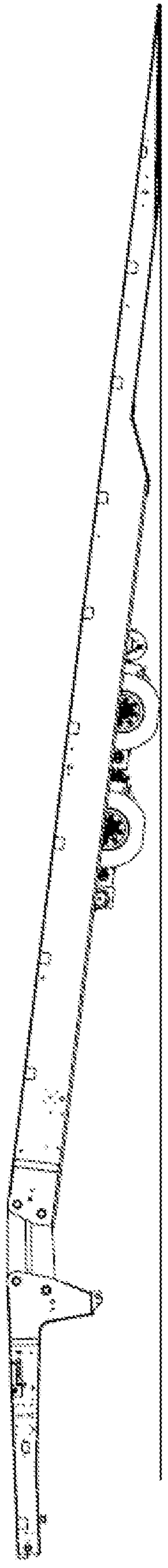
FIG. 16B is a schematic side view of the trailer apparatus in a configuration suitable for loading of the apparatus and having elements of the supplemental frame structure in a relatively medial position with respect to the main frame structure, according to an illustrative embodiment.
Figure 16C:
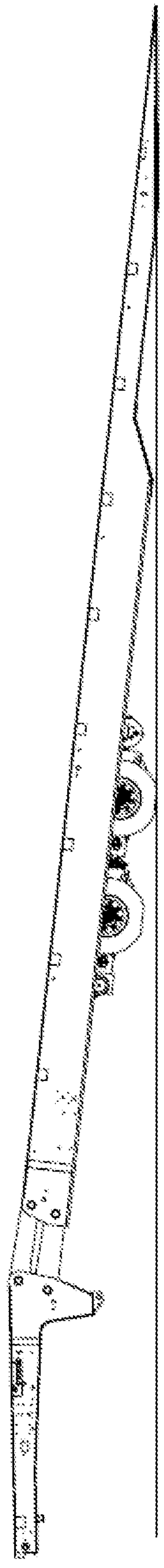
FIG. 16C is a schematic side view of the trailer apparatus in a configuration suitable for loading of the apparatus and having elements of the supplemental frame structure in a relatively forward position with respect to the main frame structure, according to an illustrative embodiment.

With reference now to the drawings, and in particular to FIGS. 1 through 17 thereof, a new trailer apparatus which embodies the principles and concepts of the disclosed subject matter will be described.

Vehicles, and in particular trailers that are towed by another vehicle, may be subject to different rules and regulations as the vehicles move from one state to another state. The applicants have recognized that while federal regulations govern many aspects of inter-state vehicles, and are thus uniform from state to state, there are state regulations relating to vehicles that may vary from state to state. Thus, traveling from one state to another can subject the vehicle to different requirements.

An illustrative example of state regulation for trailers are regulations that limit the maximum distance between the kingpin (which engages the hitch on the towing vehicle) and the rearmost axle of the trailer. The distance limitation can vary from state to state, particularly for longer trailers. However, simply positioning the axle at the greatest distance allowed by all states is not an approach that is generally acceptable, as it is often desirable for the kingpin-to-axle distance to be maximized within the permitted limits of a state in order to comply with axle weight restrictions that also apply to transport vehicles while maximizing the load carrying capability of the trailer.

The variation in state regulations on the kingpin-to-axle distance as well as axle weight considerations has resulted in the implementation of trailers with wheel assembly carriers or bogies that have an adjustable longitudinal position on the trailer to comply with the various (and varying) regulations. Using such trailers, vehicle operators are able to adjust the position of the wheel assembly carrier on the trailer as needed for compliance.

An illustrative example of a federal regulation for trailers relates to the requirement that trailers include underride barriers or guards at the rear end of the trailer to block movement of another vehicle under the deck of the trailer, which is typically positioned higher from the road surface than many passenger vehicles. Federal regulations not only require the inclusion of an underride guard on the rear of the trailer, but also dictate that the rearward-facing surface of the guard be located a maximum of 12 inches from the rearmost extremity of the trailer deck. As a result, the position of the underride guard with respect to the rear end of the trailer must be maintained in all states.

For trailers that require the rearmost extremity of the deck to be able to drop down to the ground surface for loading the deck, the underride guard can be problematic in that the presence of the guard under the deck may prevent the deck from reaching the ground surface. To address this problem, trailers have been developed that have the underride guard mounted on the wheel assembly carrier so that the underride guard can be moved further under the deck with the carrier to allow the rear end of the deck to reach the ground surface during times of loading and unloading the trailer.

However, the applicants have recognized that the inclusion of the underride guard on the wheel assembly carrier makes it difficult, if not impossible to comply with regulations regarding the positioning of the underride guard on the trailer, the regulation of the distance between the kingpin and the axle, as well as permitting adjustment of the positioning of the wheel assembly for meeting axle weight restrictions.

To address these problems, the applicants have developed a trailer apparatus in which the positions of the wheel assembly and the underride guard on the trailer may be adjusted, and the positions may be adjusted substantially independently of each other. As a result, the position of the wheel assembly may be adjusted to meet kingpin-to-axle distance restrictions, while the position of the underride guard may be maintained at the rear end of the trailer, and both of these components can be moved forwardly on the trailer to facilitate the loading and unloading of cargo on the trailer from the rear.

In some aspects, the disclosure relates to a system 1 for transporting bulky cargo from one place to another, and for example may be highly suitable for transporting cargo typically carried on a flatbed deck.

In some broader aspects, the system 1 may include a tractor 2, such as a semi-tractor, having a motor 3 for moving the tractor as well towing another vehicle such as a trailer. For the purposes of towing, the tractor 2 may include a hitch assembly 4 to which a trailer may be removably hitched.

In another significant aspect of the disclosure, the system may also include a trailer apparatus 10 for being towed by the semi-tractor or other prime mover. The trailer apparatus 10 is typically elongated with one end being a front 12 and the opposite end being a rear 14. The front 12 is oriented toward a primary direction 16 of travel and the rear 14 is oriented away from the primary direction of travel. The trailer apparatus 10 has a longitudinal axis 18 which extends from the front to the rear and generally aligns with the direction of travel.

Generally, the trailer apparatus 10 may comprise a primary frame structure 20 and a supplemental frame structure 40. The primary frame structure 20 has a top 22 and a bottom 23, and a forward end 24 oriented toward the front 12 of the trailer apparatus and a rearward end 25 toward the rear of the apparatus 10. The supplemental frame structure 40 may be positioned below the bottom 23 of the primary frame structure, and the primary frame structure may rest upon and be supported by the supplemental frame structure. The primary frame structure 20 has a longitudinal direction 26 which may be oriented parallel to the longitudinal axis 18 of the trailer apparatus. In some illustrative embodiments, the primary frame structure 20 may include a main frame 30 which may be comprised of primary longitudinal elements 32 and primary lateral elements 34 extending between the longitudinal elements 32. The primary longitudinal elements 32 extend between the forward 24 and rearward 25 ends, and the lateral elements 34 may be spaced from each other and distributed between the ends.

The primary frame structure 20 may include a kingpin 36 for engaging the hitch assembly 4 of a towing apparatus, such as the tractor 2. The kingpin 36 may be positioned toward the forward end 24 of the primary frame structure. The primary frame structure 20 may also include a load-supporting bed 38 on which a load or cargo is positionable. The load supporting bed 38 may be located on the top 22 of the primary frame structure. In some embodiments, the load-supporting bed 38 may be continuous and interrupted between the sides and ends of the primary frame structure, while in other embodiments the bed 38 may be reticulated with a plurality of openings formed by, for example, the upper surfaces of the longitudinal 32 and lateral 34 elements of the main frame. Optionally, a load supporting box may be utilized.

In a significant aspect of some embodiments of the disclosure, the primary frame structure 20 and the supplemental frame structure 40 may be movable relative to each other in the longitudinal direction 26. In many preferred implementations, such relative longitudinal movement of the structures 20 and 40 may be characterized by the primary frame structure 20 remaining stationary with respect to the ground surface and elements of the supplemental frame structure being moved with respect to the ground surface and with respect to the primary frame structure 20. Illustratively, the primary frame structure 20 may be held stationary with respect to the ground surface when the trailer apparatus 10 is hitched to the tractor 2, and the tractor is immobilized against movement with respect to the ground surface by the brakes of the tractor or mechanical means, such as placing the tractor in the "Park" gear. However, it should be recognized that relative movement between the primary and secondary frame structures may be accomplished in any suitable manner, including holding the secondary frame structure stationary with respect to the ground surface and moving the primary frame structure with respect to the ground surface, such as by utilizing the tractor 2 to push or pull on the primary frame structure via the kingpin. Also, relative movement of the frame structures 20 and 40 may also be accomplished with movement of both frame structures with regard to the ground surface.

The supplemental frame structure 40 may generally include a wheel assembly 42 for supporting the primary frame structure on the ground surface and an underride guard construct 44 for blocking movement of a vehicle or other under the rearward end 25 of the primary frame structure. In a significant aspect of some embodiments, a longitudinal position of the underride guard construct 44 with respect to the primary frame structure 20 may be adjustable independent of a longitudinal position of the wheel assembly 42 with respect to the primary frame structure.

Advantageously, adjustment of the distance between the kingpin 36 of the primary frame structure and the wheel assembly 42 of the supplemental frame structure may not be controlled or determined by the distance between the underride guard construct and the rear 14 of the trailer apparatus.

In greater detail, the supplemental frame structure 40 may include a first subframe 50 and a second subframe 52. The first subframe and the second subframe of the supplemental frame structure 40 may be movable together as a unit in the longitudinal direction 26 with respect to the primary frame structure 20. The first subframe 50 may be movable in the longitudinal direction with respect to the primary frame structure 20, and the second subframe 52 may be movable in the longitudinal direction with respect to the first subframe. The second subframe 52 may be movable in the longitudinal direction independent of the first subframe 50.

In the illustrative embodiments, the underride guard construct 44 may be located on the first subframe 50 and the wheel assembly 42 may be located on the second subframe 52. The first subframe 50 may be an upper subframe located above the second subframe 52 such that the second subframe is a lower subframe below the upper subframe. In greater detail, the first subframe 50 may be mounted on the main frame 30 of the primary frame structure in a longitudinally slidable relationship so that the first subframe can be slid with respect to the main frame. Further, the second subframe 52 may be mounted on the first subframe in a longitudinally slidable relationship so that the second subframe can be slid with respect to the first subframe.

Illustratively, the first subframe 50 may include a pair of first longitudinal elements 54, and a plurality of first lateral elements 56 that extend between the first longitudinal elements. The underride guard construct 44 on the first subframe may comprise a blocking element 58 which may extend laterally with respect to the longitudinal axis 18. The blocking element 58 may be mounted on at least one, and typically both, of the first longitudinal elements 54. The blocking element 58 may be mounted on rear ends 60 of the first longitudinal elements, and may extend laterally outwardly from the longitudinal elements 54. Also illustratively, the second subframe 52 may include a pair of second longitudinal elements 62 and a plurality of second lateral elements 64 that extend between the second longitudinal elements. The elements of the main frame 30 as well as the first subframe 50 and second subframe 52 may be formed of any suitable fabrication component, such as, for example, I-beams and channel beams with web portions and flange portions.

The trailer apparatus 10 may further include subframe mounting components 66 which may be configured to secure the frames of the primary 20 and supplemental 40 frame structures together, and may do so in a manner permitting movement or sliding movement of the frames relative to each other (e.g., sliding movement of the first subframe with respect to the main frame and sliding movement of the second subframe with respect to the first subframe). More specifically, the subframe mounting components 66 may secure the first subframe 50 of the supplemental frame structure to the main frame 30 of the primary frame structure. Further, the subframe mounting components 66 may secure the second subframe 52 to the first subframe 50.

In embodiments, the subframe mounting components 66 may include an upper clip member or members 68 which secure the first subframe 50 to the main frame 30. The upper clip members 68 may be mounted on the first subframe 50 and engaging the main frame 30. Illustratively, the upper clip members 68 may each be mounted on one of the first longitudinal elements 54 of the first subframe and engage one of the primary longitudinal elements 32 of the main frame. For example, the upper clip members 68 may be mounted on the longitudinal elements of the first subframe in laterally opposed orientations with the longitudinal elements of the main frame positioned between the members 68. The subframe mounting components 66 may also include a lower clip member or members 70 which secure the second subframe 52 to the first subframe 50. The lower clip members 70 may be mounted on the one of the second longitudinal elements 62 of the second subframe and may engage one of the first longitudinal elements 54 of the first subframe. In some embodiments, the subframe mounting components 66 may include a slide limiting hook 72 which is configured to limit an extent of sliding of the supplemental frame structure 40 with respect to the primary frame structure 20. The slide limiting hook 72 may be mounted on the first subframe 50 and may be positioned to engage one of the primary lateral elements 34 of the main frame.

Illustrative embodiments of the wheel assembly 42 may include at least one axle 74, and optionally may include two or more of the axles. The axle 74 or axles extend laterally with respect to the longitudinal axis 18 of the trailer apparatus, and multiple axes may be positioned at different locations on the second subframe in the direction of the longitudinal axis 18. The wheel assembly 42 may further include a pair of wheels 76 mounted on opposite lateral ends of the axle 74. In embodiments, the wheel assembly 42 includes suspension elements 78 for suspending the axle and associated wheels on the second subframe 52, and the suspension elements may be mounted on the second subframe and on each of the axles. Illustratively, the suspension elements 78 may include a pivot mount 80 which is mounted on the second subframe 52, and typically a pair of the pivot mounts may be utilized. Each pivot mount 80 may be mounted on one of the second longitudinal elements 62, and may be located below the respective element 62. The suspension elements 78 may also include a support member 82 pivotally mounted on each of the pivot mount, and the axle or axles 74 may be secured to the support member such that the axle and the support member pivot with respect to the pivot mount. The suspension elements 78 may further include a spring member 84 configured to bias the position of each of the support members 82 with respect to the second subframe 52. Each spring member 84 may be positioned between the support member 82 and one of the second longitudinal elements 62 of the second subframe. Illustratively, the spring member 84 may comprise an airbag, although other types of elements may be utilized. The wheel assembly 42 also includes travel brakes 86 which are configured to selectively lock the wheels associated with the axle against rotation with respect to the second subframe 52 and the housing of the axle.

The trailer apparatus 10 may further comprise a movement assembly 90 for causing movement of at least a part of the supplemental frame structure 40 with respect to the primary frame structure 20. The movement assembly 90 may be considered to actively move the primary and supplemental frame structures with respect to each other without requiring other intervening actions to effect the movement. The movement assembly 90 may selectively change the location of the wheel assembly 42 with respect to the main frame 30. For example, the movement assembly 90 may be configured to move or slide at least the first subframe 50 with respect to the main frame 30. In some configurations of the apparatus 10, the movement assembly 90 may move both the first subframe 50 and the second subframe 52 with respect to the main frame, such as when the first and second subframes are locked together to move as a unit. In some configurations of the apparatus 10, the movement assembly 90 may move the first subframe 50 with respect to the main frame 30 (and the second subframe 52) when the first and second subframes are not locked together to move as a unit. In illustrative embodiments, the movement assembly 90 includes an actuator 92, which may be elongated with opposite ends that are mounted on the main frame 30 and the first subframe 50. The actuator 92 may have an adjustable length to selectively increase and decrease the distance between the opposite ends, and the locations on the main frame and first subframe at which the ends are mounted. Illustratively, the actuator may be a hydraulically operated actuator and may be infinitely adjustable between two extreme extension positions. Specifically, the actuator 92 may comprise a cylinder and a ram. Other suitable types of actuators may also be utilized.

The trailer apparatus 10 may also comprise a position locking assembly 96 which is configured to selectively lock (and unlock) the first 50 and second 52 subframes against longitudinal movement with respect to each other. The position locking assembly 96 may be utilized to passively move, or facilitate movement of, the first and second subframes with respect to each other. The position locking assembly 96 may lock the second subframe 52 at at least two different locked positions with respect to the first subframe 50, and in the illustrative embodiments the second subframe is lockable at three locked positions with respect to the first subframe.

In the illustrative embodiments, the position locking assembly includes a plurality of locking notches 100 that are formed in one of the subframes 50, 52, and illustratively the notches are formed in one (or both) of the first longitudinal elements 54 of the first subframe 50. The notches 100 may be spaced from each other in the longitudinal direction 26, and each of the notches may be associated with one of the longitudinally-spaced, locked positions of the second subframe with respect to the first subframe. The plurality of locking notches may comprise at least three notches 100, 102, 104. In embodiments, each of the locking notches 100 may be formed in the flange portion of a beam of the longitudinal element, and each of the notches in the flanges may be bordered in the longitudinal direction by a transition feature 106.

The position locking assembly 96 may include a latching mechanism 110 for selectively engaging one of the notches 100 of the locking assembly. The latching mechanism 110 may be mounted on one of the subframes, such as the subframe other than the subframe having the locking notches. Illustratively, the latching mechanism 110 is mounted on the second subframe 52. The latching mechanism 110 may have a latched condition and an unlatched condition, and the latched condition may be characterized by resisting movement of the second subframe with respect to the first subframe, while the unlatched condition may be characterized by permitting movement of the second subframe with respect to the first subframe. The latching mechanism 110 may also include a latch member 112 which is mounted for movement between a latched position and an unlatched position. The latched position may correspond to the latched condition of the latching mechanism and may be characterized by the latch member 112 being at least partially inserted into one of the locking notches 100, and the unlatched position may correspond to the unlatched condition of the mechanism and may be characterized by the latch member 112 being removed from the locking notches. The latch member 112 may be mounted on the second subframe 52, and may be movable with respect to the second subframe, such as by pivotal movement.

The latching mechanism 110 may further include a latch actuator 114 which is configured to move the latch member 112 between the latched and unlatched positions. In some embodiments, the latch actuator 114 may be configured to selectively bias the latch member toward the latched condition or bias the latch member toward the unlatched condition. The latch actuator 114 may be mounted on the second subframe. Illustratively, the latch actuator 114 is pneumatically operated, which is highly suitable for biasing or urging the actuator, and the connected latch member 112, toward either of the latched or unlatched positions.

The latch actuator 114 may bias the latch member 112 toward the latched position, and when the latch member is not suitably aligned with one of the notches 100, the latch member may be pressed by the actuator against the edge of the flange of the longitudinal element in an area where the notch is not present. Longitudinal movement of the first 50 and second 52 subframes with respect to each other may move the latch member along the flange of the longitudinal element until the flange member contacts the transition feature 106 and then enters one of the notches 100.

In some optional embodiments, movement of the primary 20 and supplemental 40 frame structures with respect to each other may be produced in a passive manner through utilization of a position locking assembly 120 (see FIG. 15) which may be similar to or the same as the position locking assembly 96. The position locking assembly 120 may selectively lock the main frame 30 of the primary frame structure and the first subframe 50 of the supplemental frame structure together such that the frame 30 and the subframe 50 are secured together as a unit when the assembly 120 is locked, and are able to move independently with respect to each other when the assembly 120 is not locked. The position locking assembly 120 may include a plurality of locking notches 122, 124, 126 at different spaced longitudinal locations on longitudinal elements 32 of the main frame 30 of the primary frame structure. The position locking assembly 120 may further include a latching mechanism 128 mounted on the first subframe 50 of the supplemental frame structure. The latching mechanism 128 may include a latch member 130 actuated by a latch actuator 132. It will be recognized that the arrangement of the locking notches in the latching mechanism may be varied such that the locking notches are located on the first subframe 50 and the latching mechanism is mounted on the main frame 30.

In another aspect, the disclosure relates to a method of configuring or operating a trailer apparatus having at least some of the characteristics of the trailer apparatus 10 of the disclosure, which may include, for example, adjusting the longitudinal positions of components of the apparatus. Implementations of the method may utilize active, passive, or a combination of active and passive techniques for moving the frame structures and subframes with respect to each other in the longitudinal direction. Illustratively, active techniques for moving the frame elements may utilize actuators actively moving frame elements with respect to each other, such as, for example, hydraulically-actuated ram and cylinder actuators as in the movement assembly. As a further illustration, passive techniques for moving the frame elements may involve selectively holding the position of the frame elements with respect to other frame elements while utilizing an external device, such as a towing vehicle, to move frame elements which are not held in position. For example, frame elements may be held in position by activating or deactivating travel brakes on a wheel assembly and/or activating or deactivating a position locking assembly, and then utilizing force applied by the towing vehicle via the kingpin to move one or more the frame elements.

Figure 17:
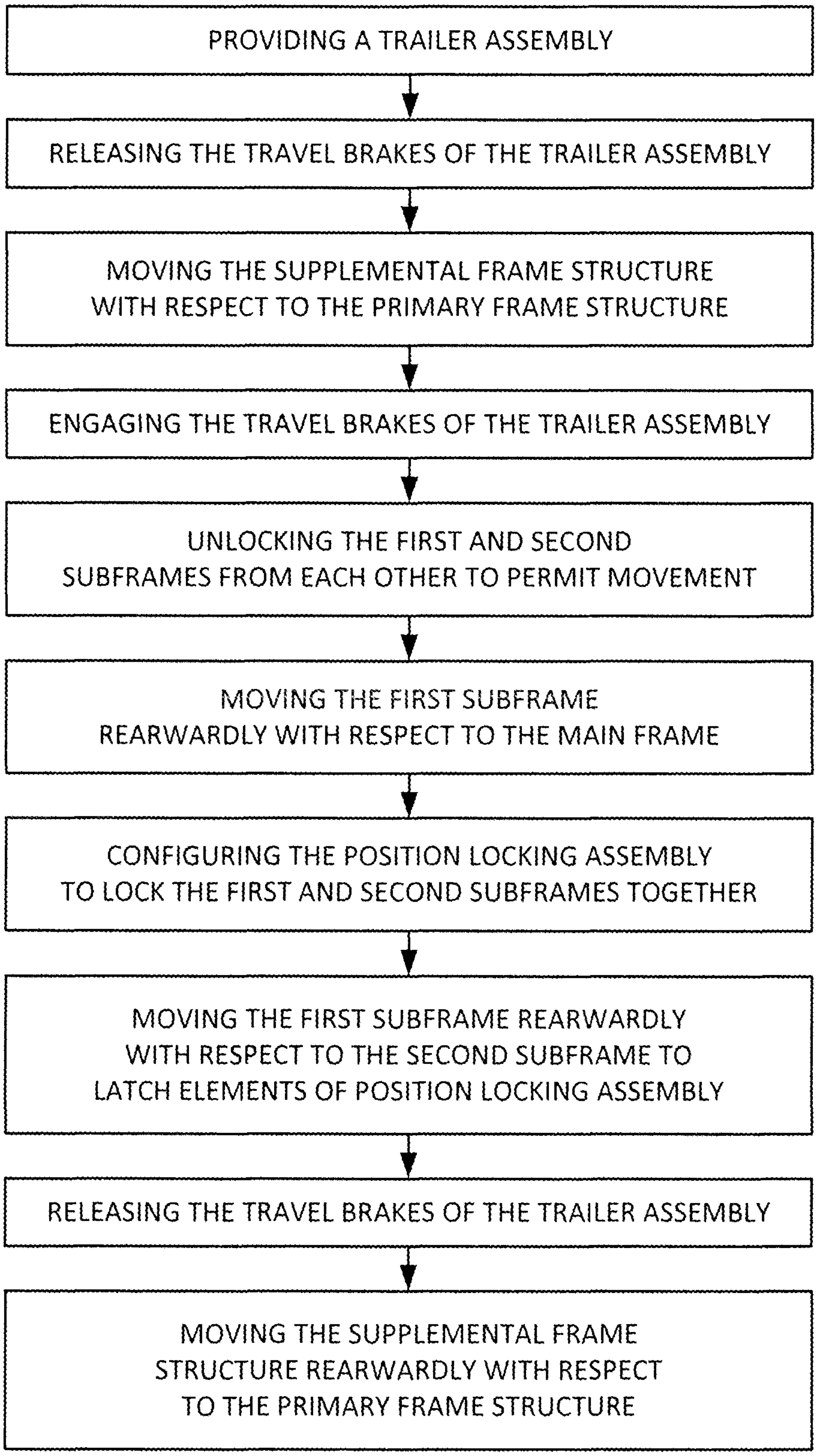
FIG. 17 is a schematic flow diagram of a method for configuring elements of a trailer apparatus, according to an illustrative implementation.

In some illustrative implementations, such as is diagrammatically illustrated in FIG. 17, the method may include providing a trailer apparatus having none, some or all of the characteristics of the trailer apparatus set forth in this disclosure. Additionally, the method may include releasing the travel brakes of the wheel assembly that, in a narrow sense permits rotation of the wheels of the wheel assembly with respect to the ground, and in a broader sense may permit movement of the other components with respect to each other, such as permitting movement of the supplemental frame structure (and the first and second subframes) with respect to the primary frame structure. The method may also include moving the supplemental frame structure rearwardly with respect to the primary frame structure, and this action may include extending the actuator of the movement assembly to move the first subframe and the second subframe forwardly with respect to the main frame as permitted by the release of the travel brakes. In some implementations, the distance of movement may be in the range of approximately 2 feet to approximately 6 feet, and illustratively the movement may be for a distance of approximately 4 feet.

The method may further include engaging the travel brakes of the wheel assembly that prevents rotation of the wheels of the wheel assembly with respect to the ground, and may restrict movement of at least the second subframe with respect to the ground. The method may continue with the unlocking of the second subframe of the supplemental frame structure from the first subframe, which may permit movement of the subframes with respect to each other. In some implementations, prior to the unlocking of the first and second subframes, the subframes may be locked together prior to the releasing of the travel brakes. The method may include moving the first subframe of the supplemental frame structure rearwardly with respect to the main frame of the primary frame structure. This action may effectively include moving the first subframe rearwardly with respect to the second subframe as the second subframe may be held in place with respect to the ground due to the engagement of the travel brakes. Illustratively, moving the first subframe may be accomplished by retracting the actuator of the movement assembly to move the first subframe forwardly with respect to the main frame.

The method may also include configuring the position locking assembly to lock the second subframe to the first subframe, and this may include activating the latching mechanism of the position locking assembly to move toward the latched condition. It will be noted that, if the latch member is not aligned with one of the locking notches in the first longitudinal element of the first subframe, the latch member may rest against an edge of the longitudinal element and the latch actuator may bias or press the latch member against the edge.

Also, the method may include moving the first subframe rearwardly until elements of the position locking assembly on the first subframe and the second subframe reengage each other. Movement of the first subframe occurs relative to the second subframe as the second subframe is held stationary by the continuing engagement of the travel brakes. Further, the travel brakes of the wheel assembly may be released. The method may also include moving the supplemental frame structure forwardly with respect to the primary frame structure, which may be accomplished by retracting the actuator of the movement assembly.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A trailer apparatus having a longitudinal axis, the apparatus comprising:

a primary frame structure having a forward end and a rearward end and a longitudinal direction oriented parallel to the longitudinal axis of the trailer apparatus;

a supplemental frame structure including a wheel assembly for supporting the trailer apparatus on a ground surface beneath the apparatus and an underride guard construct for blocking movement of a vehicle under the rearward end of the primary frame structure;

wherein the supplemental frame structure comprises a first subframe having the underride guard construct located thereon such that the underride guard construct moves as a unit with the first subframe;

wherein the supplemental frame structure comprises a second subframe having the wheel assembly located thereon such that the wheel assembly moves as a unit with the second subframe;

wherein the first subframe and the second subframe of the supplemental frame structure are movable together as a unit in the longitudinal direction with respect to the primary frame structure such that a position of the wheel assembly and the underride guard construct is simultaneously adjustable with respect to the primary frame structure; and wherein the first subframe with the underride guard construct and the second subframe with the wheel assembly are movable with respect to each other in the longitudinal direction such that a longitudinal position of the first subframe with respect to the primary frame structure is adjustable independent of a longitudinal position of the second subframe with respect to the primary frame structure.

2. The apparatus of claim 1 wherein the primary frame structure includes a kingpin for engaging a hitch assembly of a towing vehicle; and wherein movement of the wheel assembly adjusts a distance between the kingpin of the primary frame structure and the wheel assembly of the supplemental frame structure.

3. The apparatus of claim 1 wherein the second subframe is movable independent of the first subframe.

4. The apparatus of claim 1 wherein the first subframe is an upper subframe located above the second subframe such that the second subframe is a lower subframe, the first subframe resting upon and being supported by the second subframe.

5. The apparatus of claim 4 wherein the first subframe is mounted on the primary frame structure in longitudinally slidable relationship, the second subframe being mounted on the first subframe in a longitudinally slidable relationship.

6. The apparatus of claim 1 additionally comprising:

a position locking assembly configured to selectively lock the first and second subframes against longitudinal movement with respect to each other in a locked condition and selectively unlock the first and second subframes to permit longitudinal movement of the first and second subframes with respect to each other in an unlocked condition; and a movement assembly configured to cause movement of the first subframe of the supplemental frame structure with respect to the primary frame structure in the longitudinal direction to selectively change the longitudinal position of the wheel assembly with respect to the primary frame structure in the locked condition of the first and second subframes.

7. The apparatus of claim 6 wherein the movement assembly is configured to slide at least the first subframe along a main frame of the primary frame structure.

8. The apparatus of claim 6 wherein the movement assembly is configured to move both the first subframe and the second subframe with respect to the main frame when the first and second subframes are locked together as a unit.

9. The apparatus of claim 8 additionally comprising a position locking assembly configured to selectively lock the first and second subframes against longitudinal movement with respect to each other and selectively unlock the first and second subframes to permit longitudinal movement of the first and second subframes with respect to each other.

10. The apparatus of claim 9 wherein the position locking assembly is configured to lock the second subframe at at least two different locked positions with respect to the first subframe.

11. The apparatus of claim 10 wherein the position locking assembly includes:

a plurality of locking notches formed in one of the subframes, the notches being spaced from each other in the longitudinal direction of the primary frame structure, each of the notches being associated with one of the locked positions of the second subframe with respect to the first subframe; and a latching mechanism mounted on an other one of the subframes and being configured to selectively engage one of the notches of the one subframe.

12. The apparatus of claim 3 additionally comprising a first position locking assembly configured to selectively lock a main frame of the primary frame structure and the first subframe of the supplemental frame structure against longitudinal movement with respect to each other and selectively unlock the main frame and the first subframe to permit longitudinal movement of the main fame and the first subframe with respect to each other; and a second position locking assembly configured to selectively lock the first and second subframes against longitudinal movement with respect to each other and selectively unlock the first and second subframes to permit longitudinal movement of the first and second subframes with respect to each other.

13. The trailer apparatus of claim 1 wherein the first subframe extends substantially horizontally between forwardmost and rearwardmost locations on the first subframe;

wherein the second subframe extends substantially horizontally between forwardmost and rearward most locations on the second subframe; and wherein the first subframe is stacked upon the second subframe.

14. A method of adjusting longitudinal positions of components of a trailer, the method comprising:

providing a trailer apparatus having:

a primary frame structure having a forward end and a rearward end and a longitudinal direction extending between the forward and rearward ends; and a supplemental frame structure positioned below the primary frame structure and being movable in the longitudinal direction with respect to the primary frame structure, the supplemental frame structure including:

a first subframe having an underride guard construct for blocking movement of a vehicle under the rearward end of the primary frame structure; and a second subframe having a wheel assembly for supporting the trailer apparatus on a ground surface beneath the apparatus; and adjusting a position of the first subframe with the underride guard construct in the longitudinal direction with respect to a position of the second subframe with the wheel assembly by:

locking the first and second subframes together against longitudinal movement of the first and second subframes with respect to each other;

moving the locked-together first and second subframes forwardly as a unit in the longitudinal direction with respect to the primary frame structure;

unlocking the first and second subframes from each other to permit longitudinal movement of the first and second subframes with respect to each other; and moving the first and second subframes in the longitudinal direction independently of each other.

15. The method of claim 14 additionally including:

restricting movement of the second subframe by engaging travel brakes of the wheel assembly prior to the step of unlocking the first and second subframes from each other;

and wherein the step of moving the first and second subframes in the longitudinal direction includes moving the first subframe rearwardly in the longitudinal direction with respect to the primary frame structure and the second subframe.

16. The method of claim 15 additionally including:

after moving the first subframe rearwardly, disengaging the travel brakes of the wheel assembly to remove the restriction of movement of the second subframe; and moving the first and second subframes of the supplemental frame structure rearwardly in the longitudinal direction with respect to the primary frame structure.

17. A trailer apparatus having a longitudinal axis, the apparatus comprising:

a primary frame structure having a forward end and a rearward end and a longitudinal direction oriented parallel to the longitudinal axis of the trailer apparatus;

a supplemental frame structure movable in the longitudinal direction with respect to the primary frame structure, the supplemental frame structure being located underneath the primary frame structure, the primary frame structure resting upon the supplemental frame structure such that the supplemental frame structure supports the primary frame structure, the supplemental frame structure including:

a first subframe;

a second subframe located underneath the first subframe, the first subframe resting upon the second subframe such that the second subframe supports the first subframe;

an underride guard construct for blocking movement of a vehicle under the rearward end of the primary frame structure, the underride guard construct being located on the first subframe such that the underride guard construct moves as a unit with the first subframe;

a wheel assembly for supporting the trailer apparatus on a ground surface beneath the apparatus, the wheel assembly being located on the second subframe such that the wheel assembly moves as a unit with the second subframe;

wherein the supplemental frame structure is movable in the longitudinal direction with respect to the primary frame structure, and the first and second subframes of the supplemental frame structure are movable in the longitudinal direction with respect to each other such that the underride guard on the first subframe and the wheel assembly on the second subframe are movable in the longitudinal direction with respect to the primary frame structure.

18. The trailer apparatus of claim 17 wherein the first subframe extends substantially horizontally between forwardmost and rearwardmost locations on the first subframe;

wherein the second subframe extends substantially horizontally between forwardmost and rearward most locations on the second subframe; and wherein the first subframe is stacked upon the second subframe.

* * * * *